US005757954A

United States Patent [19]
Kuan et al.

[11] Patent Number: 5,757,954
[45] Date of Patent: May 26, 1998

[54] FIELD PRIORITIZATION APPARATUS AND METHOD

[75] Inventors: Chih-Chau L. Kuan, Redmond; Shih-Jong J. Lee, Bellevue, both of Wash.; Mikel D. Rosenlof, Boulder, Colo.; Robert C. Schmidt, Redmond, Wash.

[73] Assignee: NeoPath, Inc., Redmond, Wash.

[21] Appl. No.: 309,118

[22] Filed: Sep. 20, 1994

[51] Int. Cl.$^6$ .................................................. G06K 9/00
[52] U.S. Cl. ............................................ 382/133; 382/128
[58] Field of Search ................................. 382/133, 160, 382/128, 129, 132, 134, 159, 227; 364/413.13; 356/39, 40; 377/10, 11, 12, 13

[56] References Cited

U.S. PATENT DOCUMENTS

| | | | |
|---|---|---|---|
| 3,824,393 | 7/1974 | Brain | 356/39 |
| 4,122,518 | 10/1978 | Castleman et al. | 382/129 |
| 4,175,860 | 11/1979 | Bacus | 356/39 |
| 4,183,013 | 1/1980 | Agrawala et al. | 382/173 |
| 4,523,278 | 6/1985 | Reinhardt et al. | 382/133 |
| 4,700,298 | 10/1987 | Palcic et al. | 382/128 |
| 4,965,725 | 10/1990 | Rutenberg | 382/133 |
| 5,123,055 | 6/1992 | Kasdan | 382/134 |
| 5,235,522 | 8/1993 | Bacus | 382/133 |
| 5,257,182 | 10/1993 | Luck et al. | 382/133 |
| 5,268,967 | 12/1993 | Jang et al. | 382/132 |
| 5,287,272 | 2/1994 | Rutenberg et al. | 382/133 |
| 5,315,700 | 5/1994 | Johnston et al. | 345/502 |
| 5,361,140 | 11/1994 | Hayenga et al. | 358/446 |
| 5,544,650 | 8/1996 | Boon et al. | 382/133 |

OTHER PUBLICATIONS

Bacus, James W. et al., "Optical Microscope System For Standardized Cell Measurements and Analyses", *Applied Optics*, 26:16, pp. 3280–3293, 15 Aug. 1987.

Bartels, Peter H. et al., "A Self-Learning Computer Program for Cell Recognition", *ACTA Cytologica: The Journal of Clinical Cytology*, 14:8, pp. 486–494, Oct. 1970.

Tanaka, Noboru et al., "Automated Cytologic Screening System (CYBEST Model 4): an Integrated Image Cytometry System", *Applied Optics*, vol. 26, No. 16, pp. 3301–3307, Aug. 15, 1987. Copyright © 1987 by the Optical Society of America.

Erhardt, Rainer et al., "FAZYTAN: A System for Fast Automated Cell Segmentation, Cell Image Analysis and Feature Extraction Based on TV–Image Pickup and Parallel Processing", *Analytical and Quantitative Cytology*, vol. 2, No. 1, pp. 25–40, Mar.–Apr. 1980.

Green, James E., "A Practical Application of Computer Pattern Recognition Research: The Abbott ADC–500 Differential Classifier", *The Journal of Histochemistry and Cytochemistry*, vol. 27, No. 1, pp. 160–173, 1979.

Green, James E., "Parallel Processing in a Pattern Recognition Based Image Processing System: The Abbott ADC–500™ Differential Counter", *IEEE Computer Society Conference on Pattern Recognition and Image Processing*, pp. 492–498 (IEEE ©1978).

(List continued on next page.)

*Primary Examiner*—Leo Boudreau
*Assistant Examiner*—Bhavesh Mehta
*Attorney, Agent, or Firm*—Hans I. Sun; Emil Moffa

[57] ABSTRACT

Field of views of a slide are examined to assess the likelihood of existence of detectable single cells, groups, and thick groups of cells to locate objects of interest by an automated microscope. The FOV features consists of features selected from the distribution profiles of size, shape, layout arrangement, texture and density of all objects within a FOV which are compared against pre-determined criteria.

Each field of view is assigned a likelihood value based on FOV features. Areas that are blank, or contain air bubbles, or are too dense for analysis are identified and excluded for further analysis. Each FOV is ranked according to its likelihood of containing SIL (Squamous Intraepithelial Lesion) cells or cell groups of interest. These results, such as SIL, single cell ranking, group ranking are used to arrange the further examination of FOVs in a priority order.

16 Claims, 12 Drawing Sheets

OTHER PUBLICATIONS

Kasdan, Harvey L. et al., "High Performance Pathology Workstation Using an Automated Multispectral Microscope", *Applied Optics*, vol. 26, No. 16, pp. 3294–3300, (Optical Society of America Aug. 15, 1987).

Lloyd, David et al., "Multiprocessing Interval Processor for Automated Cytogenetics", *Applied Optics*, vol. 26, No. 16, p. 3356 (Optical Society of America Aug. 15, 1987).

Pycock, David et al., "Use of the MAGISCAN Image Analyser in Automated Uterine Cancer Cytology", *Analytical and Quantitative Cytology*, vol. 2, No. 3, pp. 195–202 (The International Academy of Cytology Sep. 1980).

Tanaka, Noburu et al., "Fundamental Study on An Automatic Cytoscreening System Utilizing The Pattern Recognition System, III, A New System of Automated Apparatus (CYBEST) Utilizing The Pattern Recognition Method", *Proceedings of the International Conference of Automation of Uterine Cancer Cytology*, (Tutorials of Cytology 1976).

Tucker, J.H., "Automatic Screening of Cervical Smears", *Machine Perception of Patterns and Pictures*, pp. 88–96, (Proceedings of the Conference Organized by the Physics in Industry Subcommittee of the Institute of Physics in collaboration with The National Physical Laboratory and The Institution of Electrical Engineers held at The National Physical Laboratory, Teddington, Middlesex, Massachusetts, 12–14 Apr. 1972).

Duda, Richard O. et al., "Fisher's Linear Discriminant", *Patent Classification and Scene Analysis*, Copyright © 1973, pp. 114–119.

Weber, J.E. et al., "Fuzzy Reasoning, Possibility Theory and Probability Theory in Expert Systems for Histopathology", *IEEE/Ninth Annual Conference of the Engineering in Medicine and Biology Society*, pp. 1560–1562, ©1987.

Wied, G.L. et al., "Expert Systems as Classifiers in Diagnostic Cytopathology", *IEEE/Ninth Annual Conference of the Engineering in Medicine and Biology Society*, pp. 1915–1917, ©1987.

Wied, G.L. et al., "Expert System Design Under Uncertainty of Human Diagnosticians", *IEEE/Eighth Annual Conference of the Engineering in Medicine and Biology Society*, pp. 757–760, ©1986.

Wied, G.L. et al., "Ticas–Stratex, an Expert Diagnostic System For Stratified Cervical Epithelium", *IEEE/Ninth Annual Conference of the Engineering in Medicine and Biology Society*, pp. 1557–1559, ©1987.

Serra, J., *Image Analysis and Mathematical Morphology*, pp. 372–423, Academic Press, 1982.

Smith, Warren J., "Image Evaluation", *Modem Optical Engineering: The Design of Optical Systems*, McGraw–Hill Book Company, 1966, pp. 308–325.

Pattern, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

Kurman, Robert J. et al., "Part 1: Specimen Adequacy" and Part 2: Descriptive Diagnoses, *The Bethesda System for Reporting Cervical/Vaginal Cytologic Diagnoses*, Springer–Verlag.

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

Enslein, Kurt et al., "Augmented Stepwise Discriminant Analysis Applied to Two Classification Problems in the Biomedical Field", *Computers and Biomedical Research*, 2, 568–581 (1969).

Garcia et al. "Contextual Analysis of Cervical Smears in an Automated Prescreening System" Proceedings of the 11th Annual Northeast Bioengineering Conference, 1985, pp. 158–161.

Mackin et al., "Automated Three–Dimensional Image Analysis of Thick and Overlapped Clusters in Cytologic Preparations" Analytical & Quantitative Cytology and Histology, 1993, pp. 405–417.

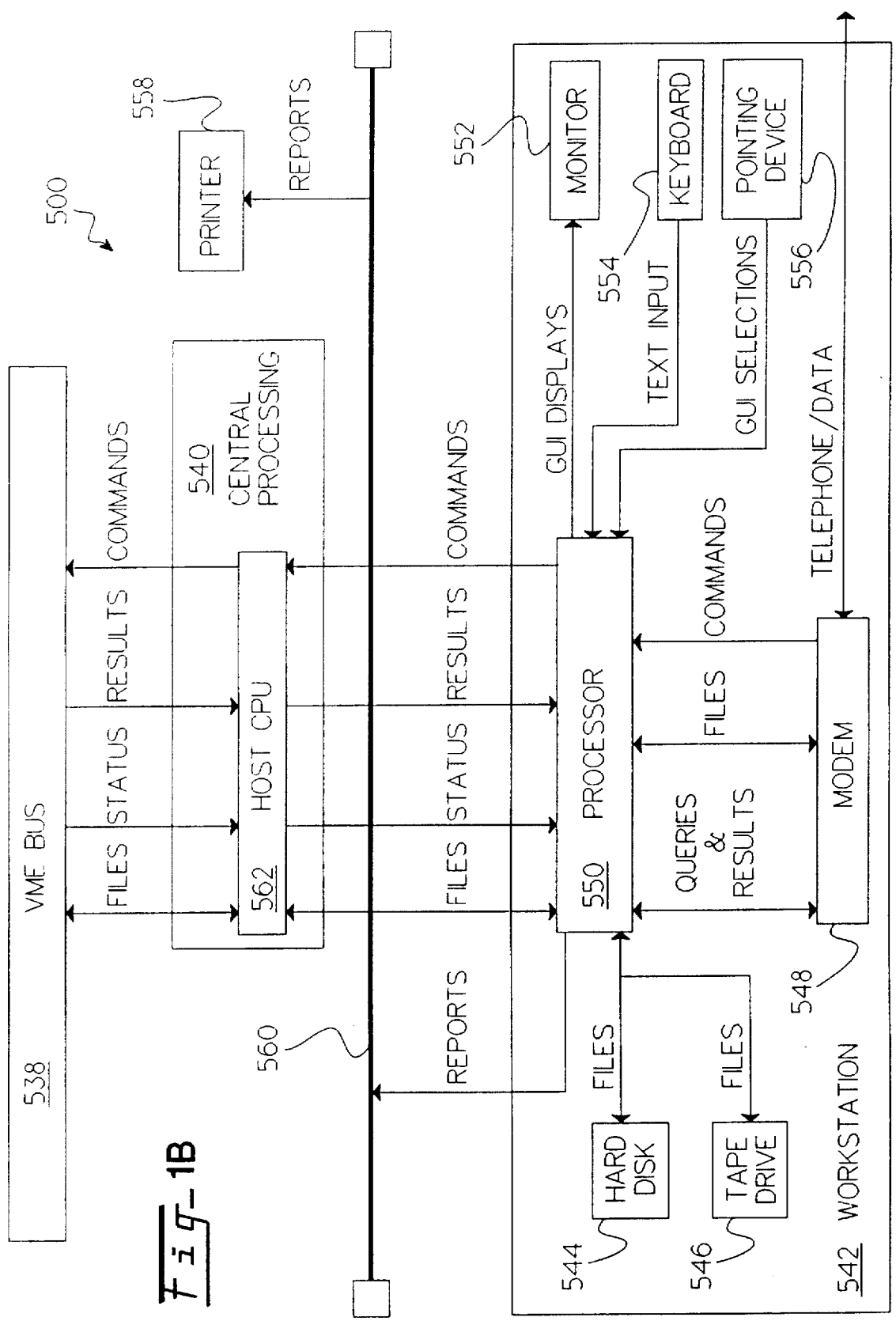

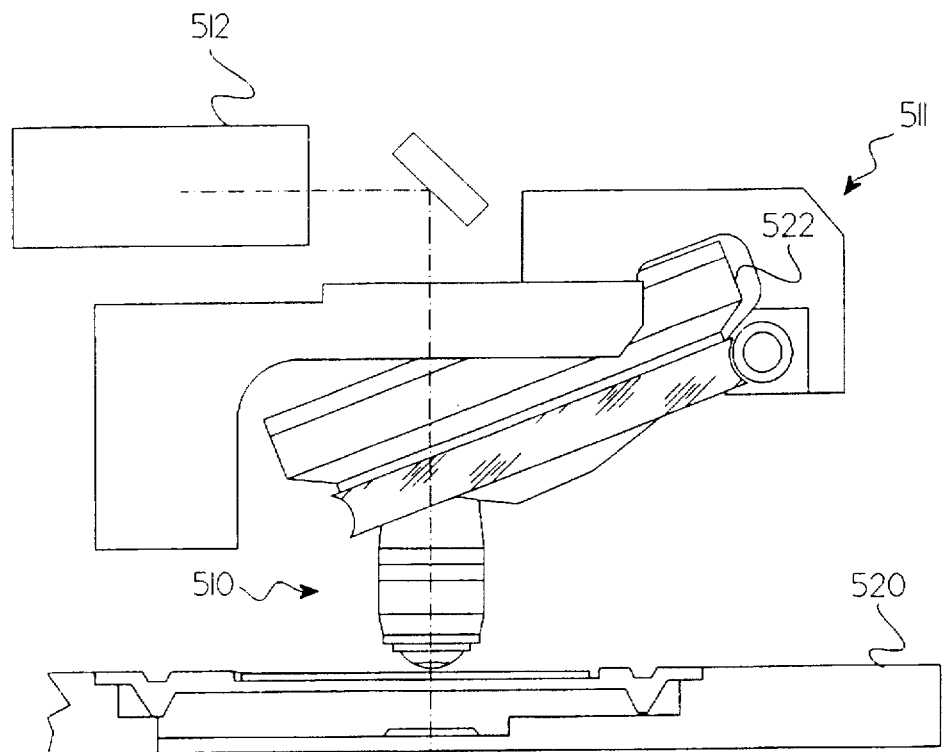
Fig-1C
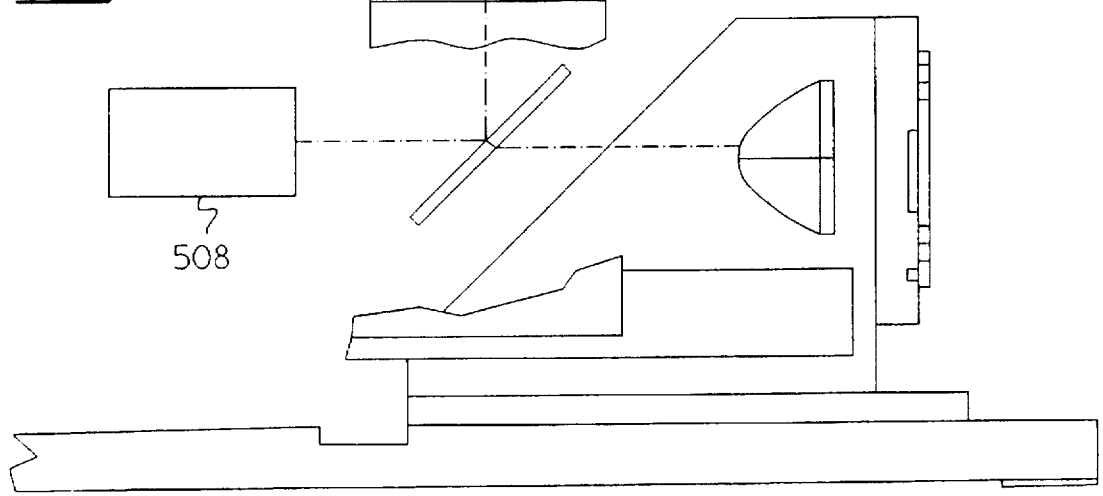

(c). (a) − (b)

(b). CLUSTER MASK (a). ORIGINAL IMAGE (a). ORIGINAL IMAGE (b). LARGE OBJECT MASKS

5,757,954

FIELD PRIORITIZATION APPARATUS AND METHOD

This invention relates to an automated cytology system and more particularly to an automated cytology system that uses field of view features to score the field of view.

BACKGROUND OF THE INVENTION

Historically, screening of cytologic material has been a task for trained technicians and cyto-pathologists. Even though screening is done by highly trained individuals, the task is repetitive and requires acute attention at all times. Since screening of cytologic material is repetitive and tedious, it has been thought to be ripe for automation. On the other hand, the complexity and variety of material found in cytologic specimens has proven very difficult to examine in an automated fashion. As a result, automated screening of cytologic specimens has been the unrealized goal of research for many years.

The prior art is focused on classifying each cell or particle on a slide. Therefore, it is a motive of the invention to provide a slide sorting field of view prioritization method and apparatus that improves slide sorting performance and slide sorting speed. The field of view prioritization apparatus does not prioritize based on features for individual cells or objects but prioritizes the field of view based on field of view features.

SUMMARY OF THE INVENTION

The invention first obtains a field of view. The field of view is then examined for the existence of single cells, endocervical groups, and thick groups to locate possible abnormal cells and other important cell types. The invention then compares the FOV features against established criteria set during a training phase.

In one embodiment a scan at 4× magnification performs morphological image processing and pattern recognition to detect and assess the probability of containing potential objects of interest. These objects of interest are clumps of biological material that are potential dysplastic cells or clusters of densely coupled cells of certain types. The invention assigns each field of view a likelihood value.

The invention provides a set of statistical decision strategies and processes that are used to process images acquired from the cover-slipped portion of a slide. The method of the invention scores fields of view by assigning different levels of likelihood based on each field of view. Features in each FOV include size, shape, optical density, layout arrangement, and texture of the detected objects, among others. The invention's feature discrimination abilities were established during its training, at which time it processed thousands of examples of a wide variety of formations of objects that may occur in a Pap smear specimen.

The invention first detects areas that are blank, or contain air bubbles, or are too dense for analysis. The invention also ranks each FOV according to its likelihood of containing SIL (Squamous Intraepithelial Lesion) cells or cell groups of interest, a SIL score. A rank of 10 for the SIL score indicates the highest likelihood of an FOV containing SIL cells. A rank of 10 for the group score indicates the highest likelihood of an FOV containing normal endocervical cell groups. A rank of 0 for either SIL group means there is little likelihood that an FOV contains objects of interest.

The invention uses these results, such as SIL, single cell ranking, group ranking, and bubble edge flags—to arrange FOVs in a priority order. The automated cytology apparatus of the invention uses this ranking to determine a slide's prioritized automatic scanning sequence. A scanning sequence is a list of fields of view, the first field of view on the list is examined first, and so on.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B and 1C show the automated cytology screening apparatus of the invention.

DETAILED DESCRIPTION OF THE PREFERRED EMBODIMENT

Figure 1A:
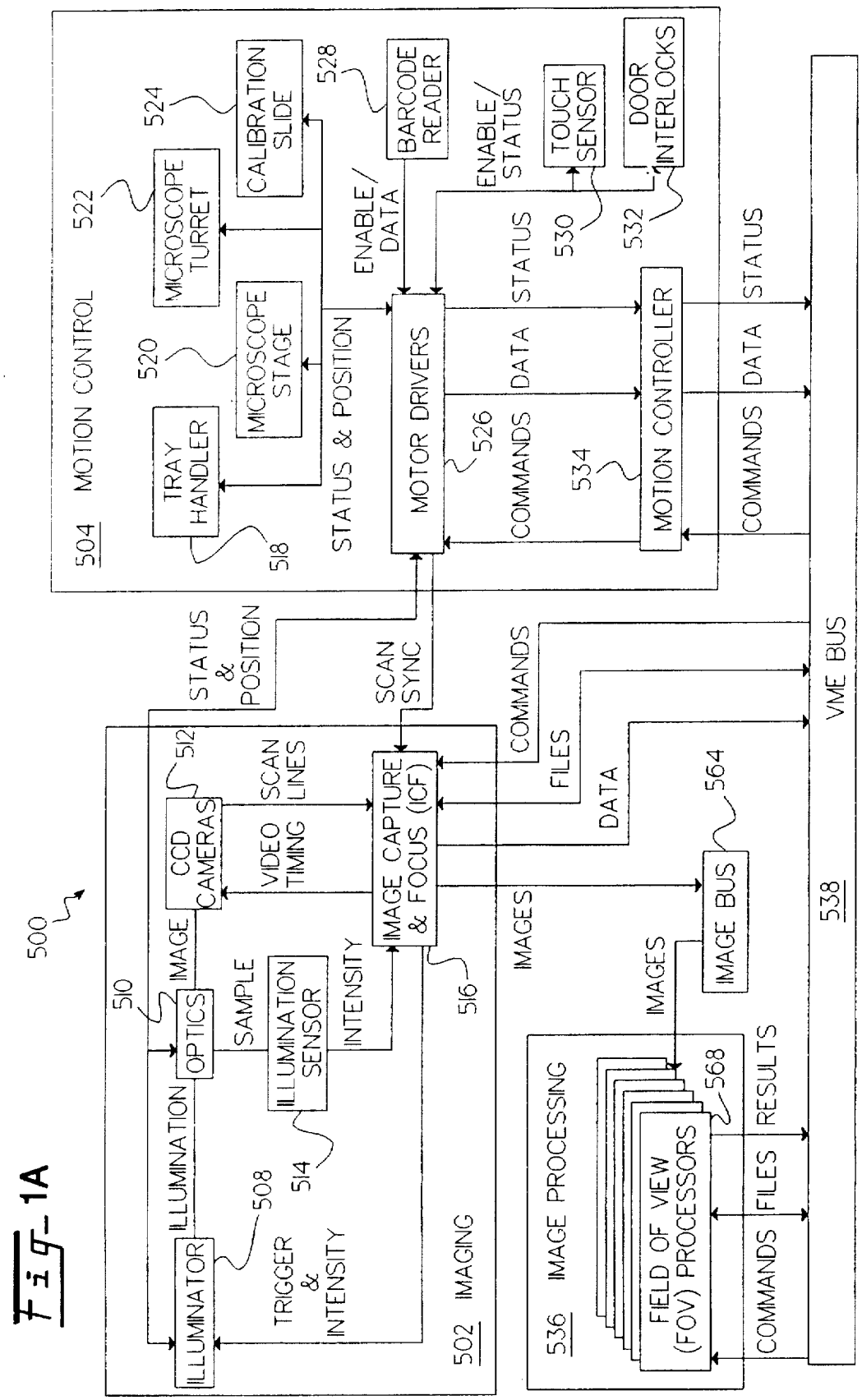

Now refer to FIGS. 1A, 1B and 1C which show a schematic diagram of one embodiment of the apparatus of the invention for field of view prioritization. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a SUN SPARC CLASSIC (TM) workstation. A tape drive 546 is connected to the workstation 550 as well as a modem 548, a monitor 552, a keyboard 554, and a mouse pointing device 556. A printer 558 is connected to the ethernet 560.

In a presently preferred embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, filed Feb. 18, 1992, entitled "Method and Apparatus for Dynamic Correction of Microscopic Image Signals" by Jon W. Hayenga, et al.; and U.S. patent application Ser. No. 08/302,355, filed Sep. 7, 1994 entitled "Method and Apparatus for Rapid Capture of Focused Microscopic Images" to Hayenga, et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on Sep. 20, 1994 unless otherwise noted, and which are all hereby incorporated by reference including U.S. patent application Ser. No. 08/309,061, to Wilhelm et al., entitled "Apparatus for Automated Identification of Cell Groupings on a Biological Specimen," U.S. patent application Ser. No. 08/309,116 to Meyer et al. entitled "Apparatus for Automated Identification of Thick Cell Groupings on a Biological Specimen," U.S. patent application Ser. No. 08/309,115 to Lee et al. entitled "Biological Analysis System Self Calibration Apparatus," U.S. patent application Ser. No. 08/308,992, to Lee et al. entitled "Apparatus for Identification and Integration of Multiple Cell Patterns," U.S. patent application Ser. No. 08/309,063 to Lee et al. entitled "Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,077 to Rosenlof et al. entitled "Apparatus for Detecting Bubbles in Coverslip Adhesive," U.S. patent application Ser. No. 08/309,931, to Lee et al. entitled "Cytological Slide Scoring Apparatus," U.S. patent application Ser. No. 08/309,148 to Lee et al. entitled "Method and Apparatus for Image Plane Modulation Pattern Recognition," U.S. patent application Ser. No. 08/309,250 to Lee et al. entitled "Apparatus for the Identification of Free-Lying Cells," U.S. patent application Ser. No. 08/309,209 to Oh et al. entitled "A Method and Apparatus for Robust Biological Specimen Classification," U.S. patent application Ser. No. 08/309,117, to Wilhelm et al. entitled "Method and Apparatus for Detection of Unsuitable Conditions for Automated Cytology Scoring."

During field of view prioritization, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view (FOV) processors 568 which receive images under control of the computer 540.

It is to be understood that the various processes described herein may be implemented in software suitable for running on a digital processor. The software may be embedded, for example, in the central processor 540.

Figure 2:
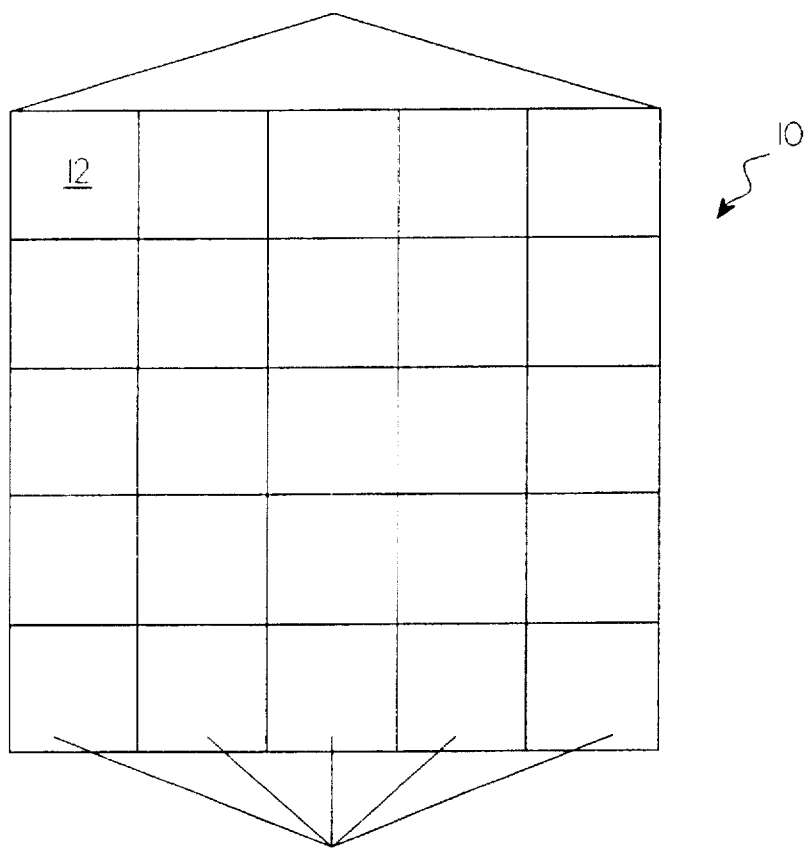
FIG. 2 shows a 4× field of view, corresponding to one full field of view captured using a 4× objective lens. It is partitioned into a 5 by 5 grid pattern of 20× fields of view. A 20× zone measures 512 by 512 pixels if imaged using a 20× objective lens.

Refer now to FIG. 2 which shows a field of view 10. In one embodiment of the invention the field of view may be taken at 4× magnification. The invention assigns predetermined zones 12 in the field of view a probability of containing objects of interest based on object segmentation and feature measurement results from 4× image processing. The feature values measured include both object features and area contextual features. Two layers of classifiers serve as preliminary rankers, followed by a final stage ranker to assign likelihood values to every detected object. These initial classifiers resolve easy cases, assign a low likelihood value to objects identified and rejected, and then pass the remaining objects to the final, more highly discriminating ranker.

Figure 3:
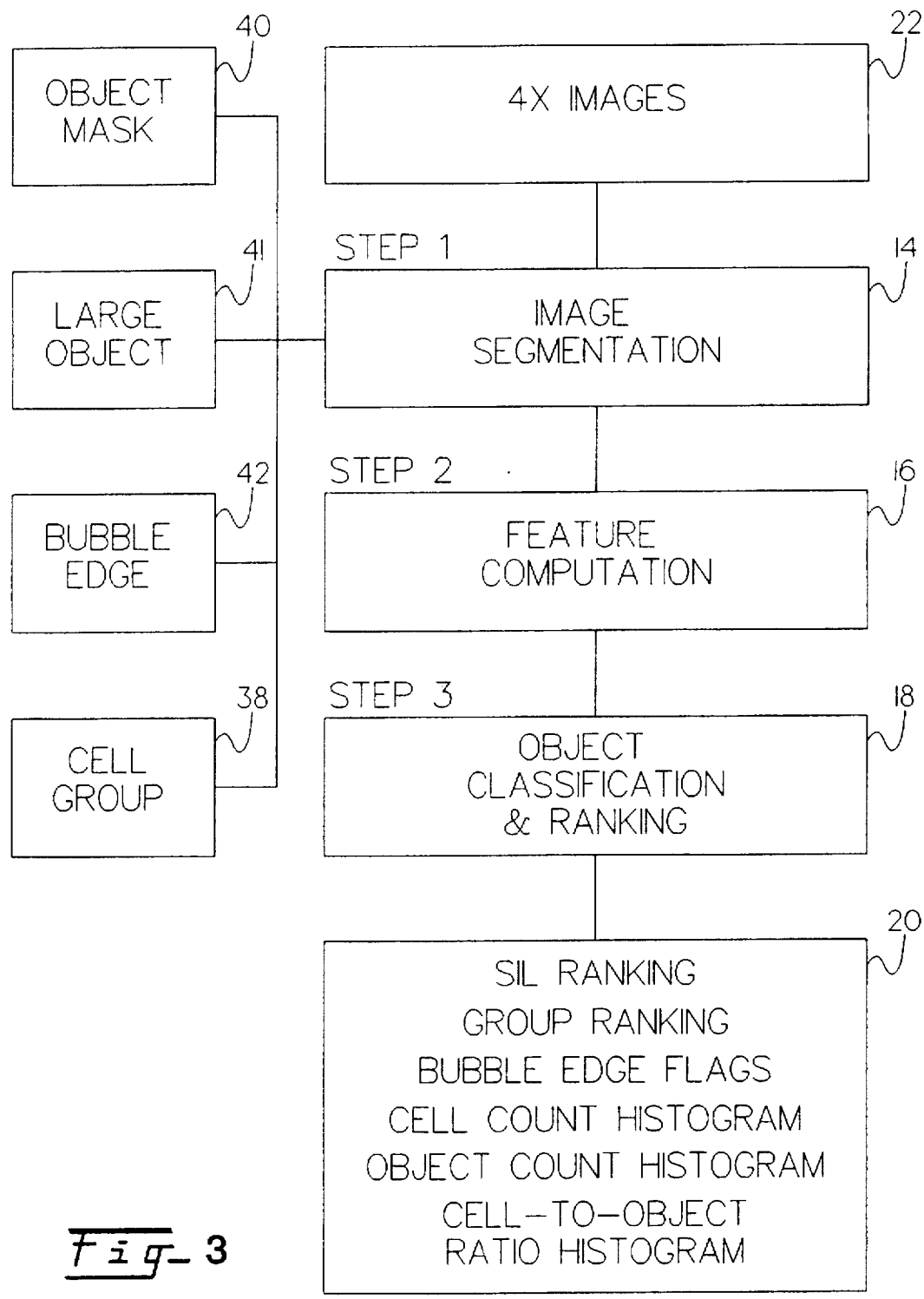
FIG. 3 shows the 4× magnification processing flow diagram of the invention and illustrates how the 4× algorithm processes the information in three major steps image segmentation, feature computation, and object classification and ranking.

Refer now to FIG. 3 which shows the field of view prioritization method of the invention. The field of view prioritization method of the invention is composed of three major steps. The first step, image segmentation 14, identifies areas of small objects, large objects, and potential cell groups, and passes them to a feature computation module. The second step, feature computation 16, measures properties of objects that were segmented during image segmentation 14. The third step, object classification and ranking 18, derives two scores: one for single cells; and one for groups of cells. These scores, as well as bubble edge flags,. the cell count histogram, object count histogram and cell= to=object ratio histogram, are used to prioritize the field of view prior to further processing. In one embodiment of the invention the next level of processing occurs at higher magnification, in particular the next level of processing occurs at a 20× magnification.

The computer 540 provides slide setup services and determines which region under the slide coverslip is to be scanned and processed at process block 20. The region covered by the coverslip is scanned in sequence by the image acquisition subsystem 502. Every FOV is processed. The invention assigns SIL and group ranks, as well as bubble edge flags, to each of the predetermined fields of view.

If the invention detects bubble edges in a field of view, the location of the bubble edge is stored by the computer 540.

The results are used to identify and exclude areas contained within air bubbles. In one embodiment of the invention these areas are eliminated from further processing.

As the invention computes priority ranking of a specimen's 20× FOVs, theses scores are accumulated. The computer 540 uses this information to derive a two-dimensional rank distribution histogram. Priority ranking and the rank distribution histograms are used to select the order of FOV selection.

The computer 540 determines which 20× FOVs are least likely to contain analyzable material. The least likely FOVs are areas that are blank or nearly so, areas that are so dense that analysis is impossible, and areas contained within air bubble edges. These unproductive areas are eliminated from further analysis so that the 20× image processing effort can concentrate on the FOVs of interest.

The computer 540 then determines and assigns likelihood values to each 20× zone of a 4× field of view that does not belong to any of the unanalyzable categories mentioned previously. Likelihood values reflect the possibility that an FOV contains objects of interest. Those skilled in the art will appreciate that an object of interest may include but is not limited to, single SIL cells or groups of cells, and may include other objects and cell types.

In one embodiment of the invention ranking decisions are made based on features that are computed from 4× images. These features include measurements such as optical density, size, shape, texture of the detected objects, and the context of the image. A set of statistical decision rules, or classifiers, use measurements of these features to arrive at ranking decisions. Ranking results are a pair of numbers that represent each 20× FOVs likelihood of containing single SIL cells or groups of cells: 0 equals no potential and 10 represents the highest potential. Results are accumulated as a slide is scanned. FOVs with no potential are eliminated from further consideration.

In one embodiment of the invention the three major steps of field of view prioritization, image segmentation 14, feature computation 16 and object classification and ranking 18 are performed on a digital computer.

The invention process 4× images and locates objects that are related to biological material. These objects could be single cells or cell groups. During segmentation 14 masks are generated that indicate the regions of interest on 4× images that could contain the objects of interest. The segmentation process and the parameters are designed based on the overall image characteristics of a training image set in order to segment out the most objects of interest.

Image segmentation converts gray scale images into four types of binary images 40: an object mask image, a large object image 41, a bubble edge image 42 and a cell group mask image 35.

Image segmentation 14 creates these masks for each 4× image. The masks uniquely identify the size, shape and location of every object detected in a FOV.

Information that is known to be specific to the domain of cytological image processing is incorporated into the segmentation process. These measures include cellular object size and shape, commonly seen artifact objects on cervical slides, image resolution, and contrast of 4× imagery.

Figure 4:
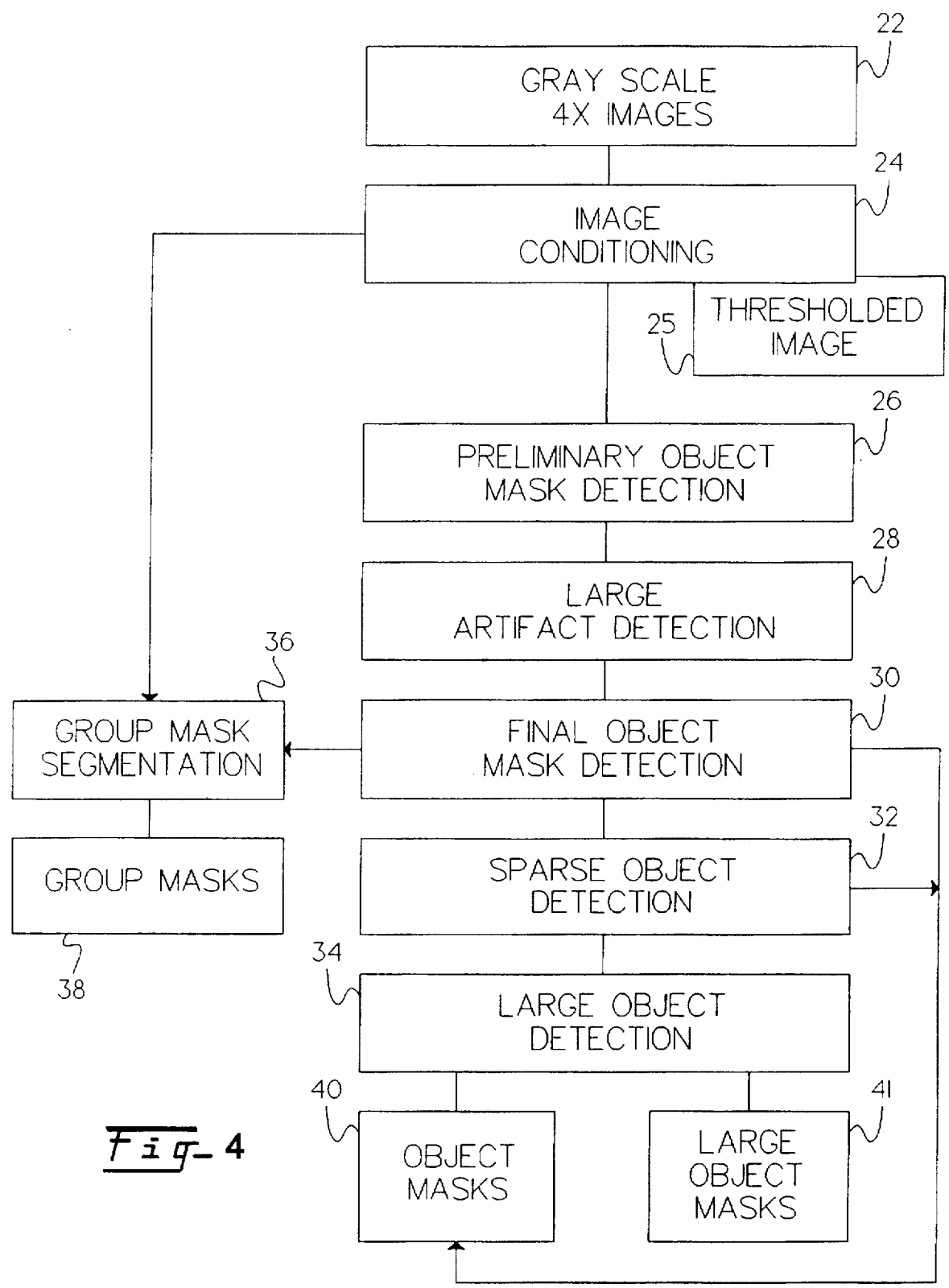
FIG. 4 shows the image segmentation process of the invention.

Refer now to FIG. 4 which shows image segmentation 14 in more detail. The 4× images 22 are clipped to limit image pixel values within 25 to 180 during image conditioning 24 to produce a threshold image 25. Objects of interest, for example, cellular materials, are within this range; however, pixels of dense artifacts or slide background could go beyond this range. Those skilled in the art will realize that these ranges are for a CCD camera whose pixel values range from 0–255, 8 bits, and that other imaging data ranges will have like ranges of differing values.

After image conditioning 24, the first processing step is preliminary object mask detection 26, which is a high-pass filtering technique. This step is designed to detect individual cells or other objects, including red blood cells and white blood cells. In general, the low spatial frequency component of an image corresponds to the image's background, which are areas of gradual, or smooth, change in contrast. The high spatial frequency component of an image corresponds to objects that are usually nuclei. Since the objective of the segmentation process is to find pixels that represent nuclei rather than pixels that represent the image background, it is desirable to remove the background. The algorithm uses low-pass filtering to suppress background contrast and enhance nuclear areas.

Figure 5:
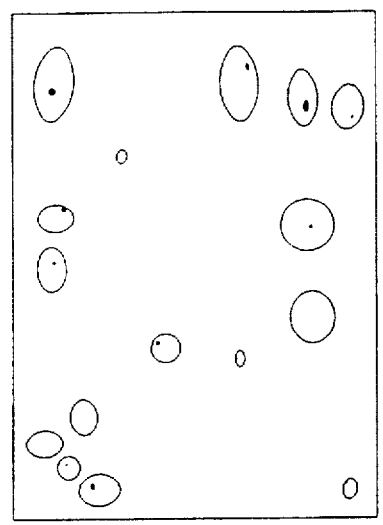
FIGS. 5A, 5B and 5C show the steps in enhanced image generation.
Figure 5:
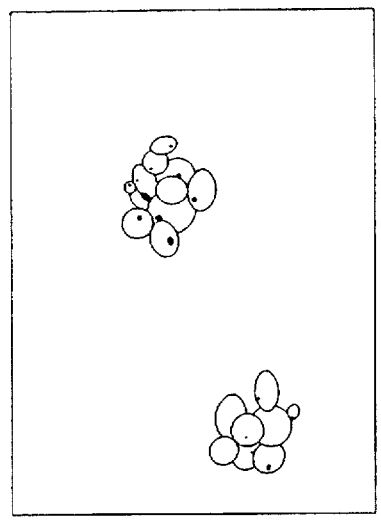
Figure 5:
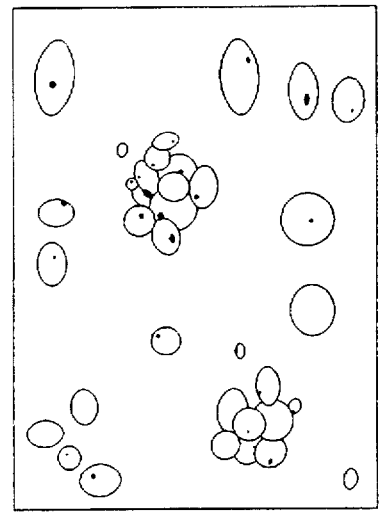

Refer now to FIGS. 5A, 5B and 5C which show a pixel intensity profile of a one-dimensional line. In FIG. 5A, a gray scale image is clipped to limit the gray scale dynamic range, image conditioning. Since objects at 4× magnification are small, a low-pass filtering method using a 5 by 5 pixel kernel is applied. The result is the low-pass filtered image shown in FIG. 5B. The original image, FIG. 5A, is then subtracted from the low pass filtered image FIG. 5B. This generates the high-passed enhanced image illustrated by FIG. 5C. The high-pass operation removes the low frequency component, which is the low contrast area of an image.

To accommodate local contrast variation in an image, the enhanced image is partitioned into sub-regions, then each is adaptively thresholded by its threshold value. Each adaptive threshold value is computed based on pixel histograms from the quadrant. Threshold values selected by this method are based on the criteria of maximizing between-class variance. The two classes of pixels in an image are the object-pixel class and the background-pixel class.

Figure 6:
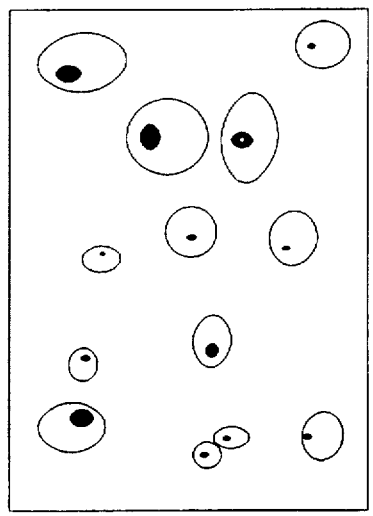
FIGS. 6A and 6B show large object detection.
Figure 6:
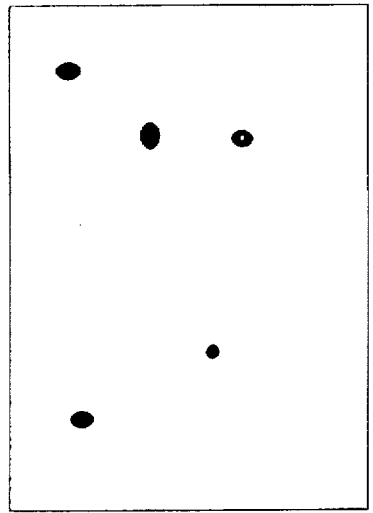

The step of large artifact detection 28 is shown in FIGS. 6A and 6B. This detection process can work at coarser image resolution. Therefore, the thresholded image 25 from the previous step is first down-sampled. A down-sampled image is generated by selecting every other pixel both horizontally and vertically from the original resolution image 22, reducing the data volume down to one quarter of that of the original image. This process increases processing speed. Next, morphological operations remove isolated noise-like pixels. Connected component analysis is then applied to detect large objects. Attributes of these large objects are passed through a classifier to identify those objects that meet size and shape criteria. The edge mask of detected edges is then enlarged 2 pixels on each side to mask out objects that are close to the edges.

If large artifacts such as bubble edges are present, objects detected in the preliminary mask operation are excluded using the edge mask produced by large artifact detection. Next, a morphological object size filter eliminates single pixel objects that are unlikely to be cellular objects. The result is the final object mask 30.

The final object mask is further processed to locate sparsely distributed objects 32. Such objects tend to correspond to free-lying isolated cells. Because the objects have relatively clear backgrounds, the higher resolution single cell analysis identifies them more readily. First, the final object image is morphologically closed to form a cluster mask. Next, the cluster mask is dilated. Objects that fall within the cluster masks are removed, and any remaining objects are qualified as sparse objects. A distance transform is applied to the background image for future distance feature measurement.

The final object mask contains segmentation masks of various types of objects. In large object detection 34, the primary focus is to find large objects that are of interest to the SIL detection process and are potentially abnormal nuclei. First, a morphological opening operation is applied to eliminate small objects from the object image. Next, a conditional dilation recovers the shapes of any remaining large objects. Although this size filtering could be accomplished by a connected component method, the morphological method was adopted because it is faster.

The next step in the image segmentation process is to segment potential cell groups 36. The goal is to locate areas that contain closely clustering nuclei or very dark thick groups in which individual cells can barely be differentiated.

Group mask segmentation 36 begins with image conditioning, which is similar to that for preliminary object segmentation. Next, the image is low-passed to generate a full-image dark mask. The whole full-image dark mask is a result of adaptively thresholding the low-passed image. The final object image from the final object mask detection step 30 is used for detecting clustering objects. Morphological operations such as dilation, conditional dilation, by the whole image dark mask, and opening are applied to the image to create a preliminary group mask 38. If an image contains very dark areas, pixel values <65, these areas are reshaped by an opening operation and then incorporated into the preliminary group image.

The refined group image is further conditioned by the whole image dark mask and reshaped. A connected component analysis method detects group candidates that have areas greater than a predetermined minimum area. If there are fewer than a certain number of candidates selected by this method, those groups detected in the preliminary group image but not spatially close to the selected candidates are incorporated to form a new group segmentation image. This modified image is again processed by connected component analysis to generate the final group segmentation.

As segmentation progresses, the method calculates associated features for each segmented object. Object features are computed from the original gray scale image as well as from the segmentation masks. Features describe both segmented objects and the image context (using whole image features such as brightness). For computational efficiency, all feature computation processes are mixed with the segmentation processes. That is, as a segmentation mask is generated, all the feature computation that needs the mask takes place before the generation of other segmentation masks. This design minimizes the memory resources needed because objects can be classified at an intermediate step before all features are calculated.

Feature calculation measures various characteristics of objects of interest. Comparison of object characteristics to those of example objects makes it possible for the algorithm to determine the likelihood of those 20× zones containing SIL cells or endocervical cell groups. Features are measures of characteristics of objects or whole images such as size, shape, texture, optical density and context. Since cellular objects at 4× magnification are quite small, precision of feature measurements on each object is limited. Therefore, the contextual information of the image becomes very important. The algorithm calculates two sets of features for SIL FOV ranking and two sets for endocervical cell group ranking. The first set is used by box filters to identify and eliminate blank or obscured FOVs, which are those images that contain no segmented objects. The second set is used to further classify and rank those FOVs that do contain segmented objects.

This section lists the features that are measured, then uses to provide SIL ranking. SIL features are measured in each subarea, which is a 20× zone of a 4× image corresponding to one 20× FOV.

(1) Number-of-objects, no_obj—The estimated number of segmented objects in a 20× zone. This feature is calculated from the total number of pixels of the segmented objects within a 20× zone divided by the statistical mean of object areas, which is 4.

(2) Segmented objects' area ratio, cell_obj_ratio—Calculates the ratio of the total number of segmented objects within a 20× zone to that 20× zone area. Since the sizes of 20× zones vary within a small range (102×102 to 104×104), this feature is correlated to no_obj.

(3) Object gray density mean, obj_mean_gray—Measures the gray scale mean of the pixels of all segmented objects within a 20× zone.

(4) Object gray density variation, cell_std_gray—Measures the gray scale standard deviation of the pixels of all segmented objects within a 20× zone.

(5) Object optical density mean, obj_mean_od—Measures the average optical density of the pixels of all segmented objects within a 20× zone.

(6) Estimated number of large objects, no_cells—This is calculated from the total number of pixels of the segmented large objects within a 20× zone divided by the statistical mean of object areas, which is 7.

(7) The segmented large objects area ratio feature, obj_area_ratio—Measures the ratio of the total number of segmented large object pixels within a 20× zone to the area of that 20× zone.

(8) The large object gray density mean feature, cell_mean_gray—Measures the average gray scale of all the pixels of segmented large objects within a 20× zone.

(9) Large object gray density variation, cell_std_gray—Measures the gray scale standard deviation of all large segmented object pixels within each 20× zone.

(10) Large object optical density mean, cell_mean_od—Calculates the mean optical density of all segmented large object pixels within a 20× zone.

(11) The estimated large objects to objects ratio feature, cell_obj_ratio The ratio of the estimated number of large objects to the estimated number of objects.

(12) A sparse object area ratio feature, sparse_object_area_ratio—Calculates the ratio of the total number of segmented sparse object pixels in a 20× zone to the area of that 20× zone. Features 13 and 14 measure distances between neighboring objects.

(13) obj_mean_distance1—The average distance between neighboring objects. This measurement is from the distance transformation and it results from the whole 4× image: object segmentation image is inversed then distance transformed. A skeleton (which divides the image into zones-of-influence) of the transformed image is created by generating morphological opening residue. The values of all the pixels of the skeleton within a 20× zone are summed, then divided by the total number of pixels accumulated.

(14) obj_mean_distance2—The object mean distance1 feature (feature 13) divided by the estimated number of objects in the 20× zone.

(15) Large object contrast, cell_contrast—The difference between the large object gray density mean and the adaptive threshold value of the quadrant the 20× zone is within. If this zone is between quadrants, the average threshold value is used.

(16) Image high-frequency score, focus_score—A 4× whole image feature applied to every 20× zone. This calculation is derived from the histogram of the high-passed 4× image, which is a weighted sum of all the histogram bins from 25 to 255:

Endocervical Object Features

This section describes the features measured from each segmented cell group area in a 4× image that are used for endocervical group ranking.

(1) area—The number of pixels contained in a segmented group object.

(2) autothresh_orig2—The same measurement as autothresh_orig except the gray scale values considered are within a group segmentation mask that has first been eroded by a 3×3 element (1 pixel). The autothresh_orig feature is based on the assumption that original image gray scale values within the nuclear mask are bimodally distributed. This feature is the threshold that maximizes the value of between-class variance [Otsu, N].

(3) compactness—compactness=perimeter*perimeter/area Features 4 through 8 are cooccurrence homogeneity and interia functions.

The "cooccurence" or "S" matrix used to compute these functions is derived from the optical density image. To compute this matrix, the optical density image is first thresholded into 6 sets evenly divided between the maximum and minimum OD value of the cell's nucleus in question. The S matrix is computed by finding the number of transitions between values in the six sets in a certain direction. Each transition is called a run. Since we have six sets the S matrix is 6×6. As an example, consider a pixel of value 1 and its nearest neighbor to the right which also has the same value. For this pixel, the S matrix for transitions to the right would therefore increment in the first row-column. Since pixels outside the nuclear mask are not analyzed transitions are not recorded for the pixels on the edge. Finally, after finding the number of transitions for each type in the S matrix, each entry is normalized by the total number of transitions. The suffixes on these features indicate the position the neighbor is compared against. They are as follows: _1_0: 1-pixel to the east. _2_0: 2-pixels top the east. _4_0: 4-pixels to the east. _1_135: 1-pixel to the south-west.

(4) cooc_homo_1_0—The homogeneity function is defined in Computer Vision.

(5) cooc_homo_1_135—The homogeneity function is described in Computer Vision.

(6) cooc_homo_2_0—The homogeneity function is described in Computer Vision.

(7) cooc_inertia_1_0—The inertia function is defined in Computer Vision.

(8) cooc_inertia_4_0—The inertia function is defined in Computer Vision.

(9) density_1_2—This feature is calculated by doing a 4-connect distance transform, then a conditional histogram. The difference between the "1" bin value and the "2" bin value of the histogram is called density_1_2.

(10) dil_res_mean—The mean of dilation residue (7×7) of the original image in a 3 pixel-wide outer ring of the group mask.

(11) dil_res_mean2—The mean of dilation residue (7×7) of the original image in a 3 pixel-wide inner ring of the group mask.

(12) focus_score—Measures high frequency as described in feature 16.

(13) integrated_density_od—Measures integrated optical density. It is the summation of all pixel values within an area of interest from the optical density image (converted from original image by a gray scale-to-od lookup table).

(14) mean_od—The mean of optical density within the group segmentation mask.

(15) mean_orig2—The same measurement as mean_orig except the area of interest is first eroded 1 pixel by a 3×3 structuring element. The mean_orig feature is the mean of gray scale value of pixels within an area of interest. It is calculated simultaneously with integrated_density_orig from the original image.

(16) nc_contrast_orig—Makes a nuclear to cytoplasm measurement. This is the mean of gray values in the outer ring minus mean_orig2.

(17) nuclear_max—A mask shape measurement feature that is the greatest 4-connected distance transform value within each labeled region. This is calculated simultaneously with perimeter and compactness using the distance transformed image.

(18) percentage_run—The total number of runs in the cooccurrence matrix/area. Feature 19 & 20 are texture features.

When calculating texture features, two global variables can be modified. ftOccurranceDelta is an integer specifying the distance between the middle threshold (mean) and the low threshold, and the middle (mean) and the high threshold. ftOccurranceOffset is an integer specifying the number of pixels to "look ahead" or "look down". To do texture analysis on adjacent pixels, this number must be 1. To compute the texture features the "S" or "cooccurrence matrix" is first defined. To compute this matrix, the original image is first thresholded into 4 sets. Currently the thresholds to determine these four sets are as follows, where M is the mean_orig: $x=1$ if $x<M-20$, $x=2$ if $M-20<=x<M$, $x=3$ if $M<=x<M+20$, $x=4$ if $x>=M+20$. The cooccurrence matrix is computed by finding the number of transitions between values in the four sets in a certain direction. Since we have four sets the cooccurrence matrix is 4×4. As an example consider a pixel of value 1 and its nearest neighbor to the right which also has the same value. For this pixel, the cooccurrence matrix for transitions to the right would therefore increment in the first row-column. Since pixels outside the nuclear mask are not analyzed transitions are not recorded for the pixels on the edge. Finally, after finding the number of transitions for each type in the coocurrence matrix each entry is normalized by the total number of transitions. Texture_correlation and texture_inertia are computed for 4 directions East, South East, South, and South West.

(19) texture_correlation—texture correlation function calculated is described on page 187 of Computer Vision written by Ballard & Brown, Prentice-Hall, 1982.

(20) texture_inertia—Also described in Computer Vision.

Object classification and ranking are based on features computed from each object (that is, from each zone or segmented group). After features have been measured, the algorithm performs object classification and ranking, once for SIL and once for group. It issues two probabilistic ranking scores, which are measures of how likely it is for an image to contain cellular information that should be analyzed by the 20× image processing algorithms. A probabilistic rank is an integer between 0 and 10. A rank of 0 means low likelihood that an image contains potential information of interest. Such FOVs contain no data whatsoever, or they are so obscured by blood, mucus, inflammation, air bubbles, or foreign materials that no objects can be differentiated. As blank FOVs are identified, they are assigned rank 0 and eliminated from further processing. Ranks between 2 and 10 represent increasing likelihood, with a rank of 10 indicating that it is quite likely that the image contains the cellular information of concern.

The process of classification is hierarchical. The rationale of the hierarchies is to reject and assign minimum ranks to FOVs that are very unlikely to contain objects of interest at the early stages. Those objects that have a higher possibility or likelihood are passed down further into the hierarchy, where more features and finer classifiers are used to eliminate unlikely objects. Finally, the remaining objects are passed to the last stage probabilistic ranker to assess the appropriate rank for them. Note that the minimum rank assigned at the later stage is always equal to or higher than those at the earlier stage.

Figure 8:
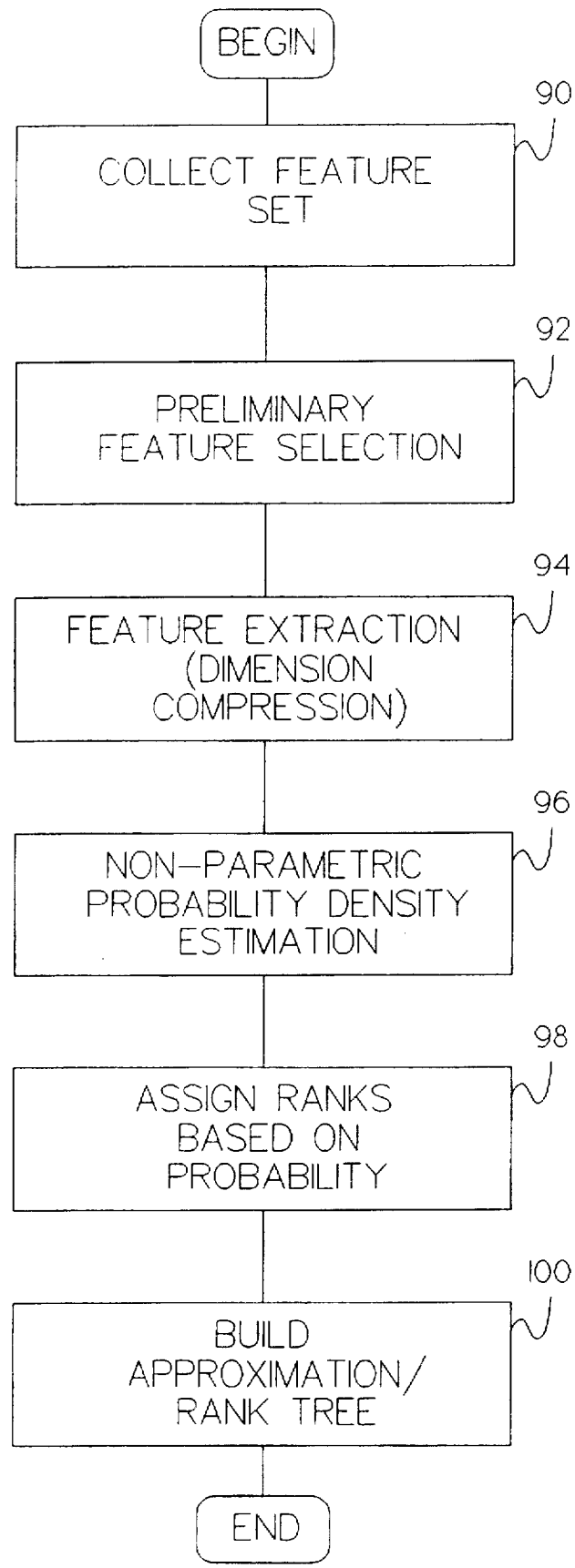
FIG. 8 shows the process for building a probabilistic rank tree.

There are two ranking trees used in the invention. This section discusses the process of building the trees. In general, the ranking tree assigns a rank to a given feature vector based on the estimated probability that the feature vector is from an object of interest—a zone containing SIL cells or endocervical cell groups. The process for building a probabilistic rank tree 100 is illustrated in FIG. 8.

Given a training data set 90 with very high feature dimension, a feature selection 92 method such as stepwise discriminant analysis for example, the stepdisc procedure of SAS, a statistical data analysis package, is first applied to select a subset of N features. The N selected features should contain most of the discriminatory information available in the full feature list, so number N may be relatively large.

Feature dimensions N are then reduced to a smaller M by a classical feature extraction method 94: discriminant analysis. The method maps the training data set into a new data set of M dimensions.

Probability Density Estimation—With this data set, a non-parametric Parzen probability density estimation method 96 is used to compute the probability distributions over the M feature spaces. Parzen Estimation is one method of estimating the data probability distribution, given that the data set is adequately representative and the feature dimensionality is not too high [see *Introduction To Statistical Pattern Recognition*, K. Fukunaga]. The probability density function value at every feature point is estimated by using all the other feature samples in the training set T. Once the nonparametric Parzen Estimator, using all the training samples of T, has estimated the probability, we will then be able to use the trained Estimator to assign likelihood to unknown feature vector X.

Since the Parzen Estimator actually computes likelihood values based on where X is located in feature space, the computation result can be approximated by pre-partitioning the whole feature space into many small regions such that all feature vectors that fall within the same region have very similar likelihood values; that is, we can determine the approximated likelihood by computing which region X belongs to. Since a binary classification tree is a nonparametric, recursive data partitioning method, it is selected for this approximation work.

To build an approximation binary tree, the computed probability (0–1) associated with each feature vector is first discretized into R (0–10) levels of ranks. Then the data set of M-dimensional features with the assigned ranks is used to construct a linear binary decision tree that assigns the estimated probability likelihood (rank) in a way similar to the Parzen Estimator in step 98.

Figure 9:
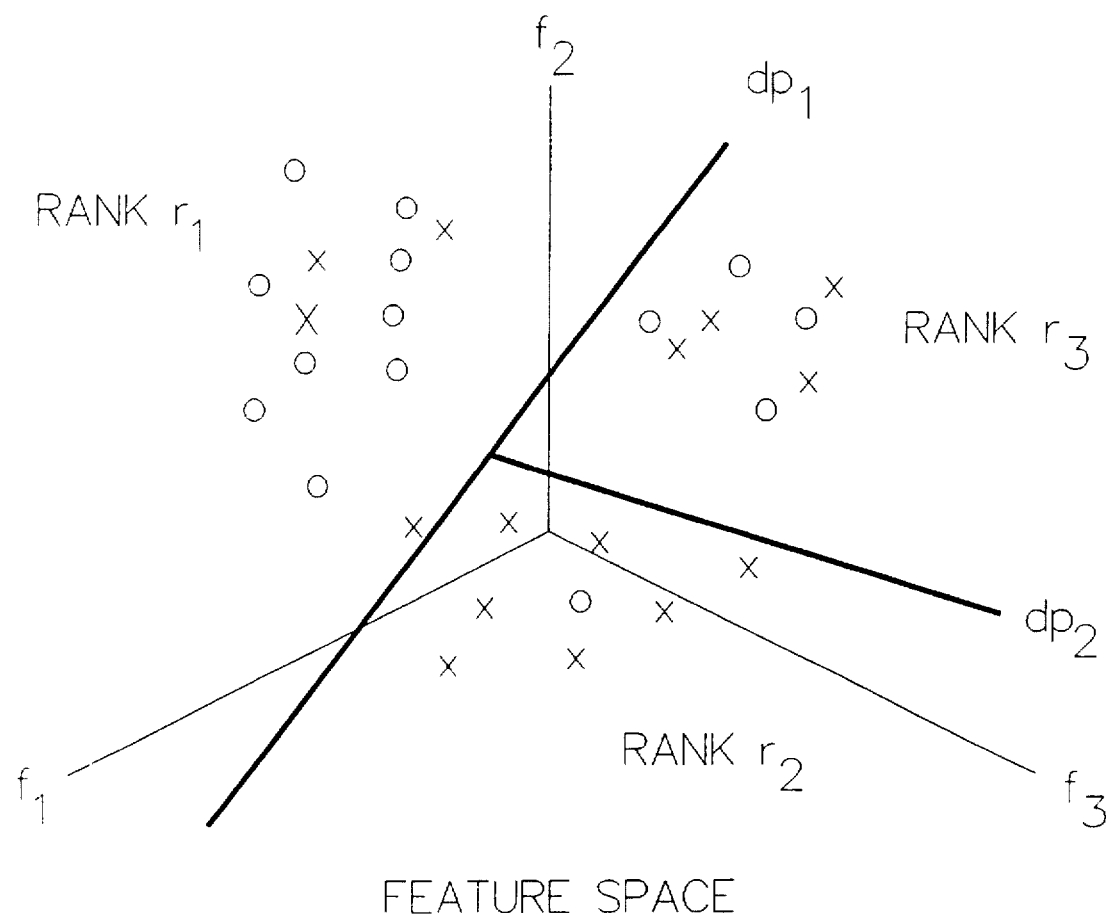
FIG. 9 shows the building of an approximation ranking tree from the training data and shows an example of two types (x and o) of data samples distributed somewhat as clusters over a 3-D feature space.

FIG. 9 shows an example of two types (x and o) of data samples distributed somewhat as clusters over a 3-D feature space. Depending on the location or distance to each cluster, a feature vector has one of three different probabilities of being class x: $r_1$, $r_2$, or $r_3$. If probability r defined as the ratio of the number of x to the total number of x and o in each cluster or region, then $r_2 > r_3 > r_1$. Given an unknown X, its rank can be determined by computing which region X falls within. The Fisher linear decision hyper-planes $dp_1$ and $dp_2$ of a rank approximating binary tree separate different probability density regions within the feature space; thus, they allow an estimation of the rank of X by region determination.

Figure 7A:
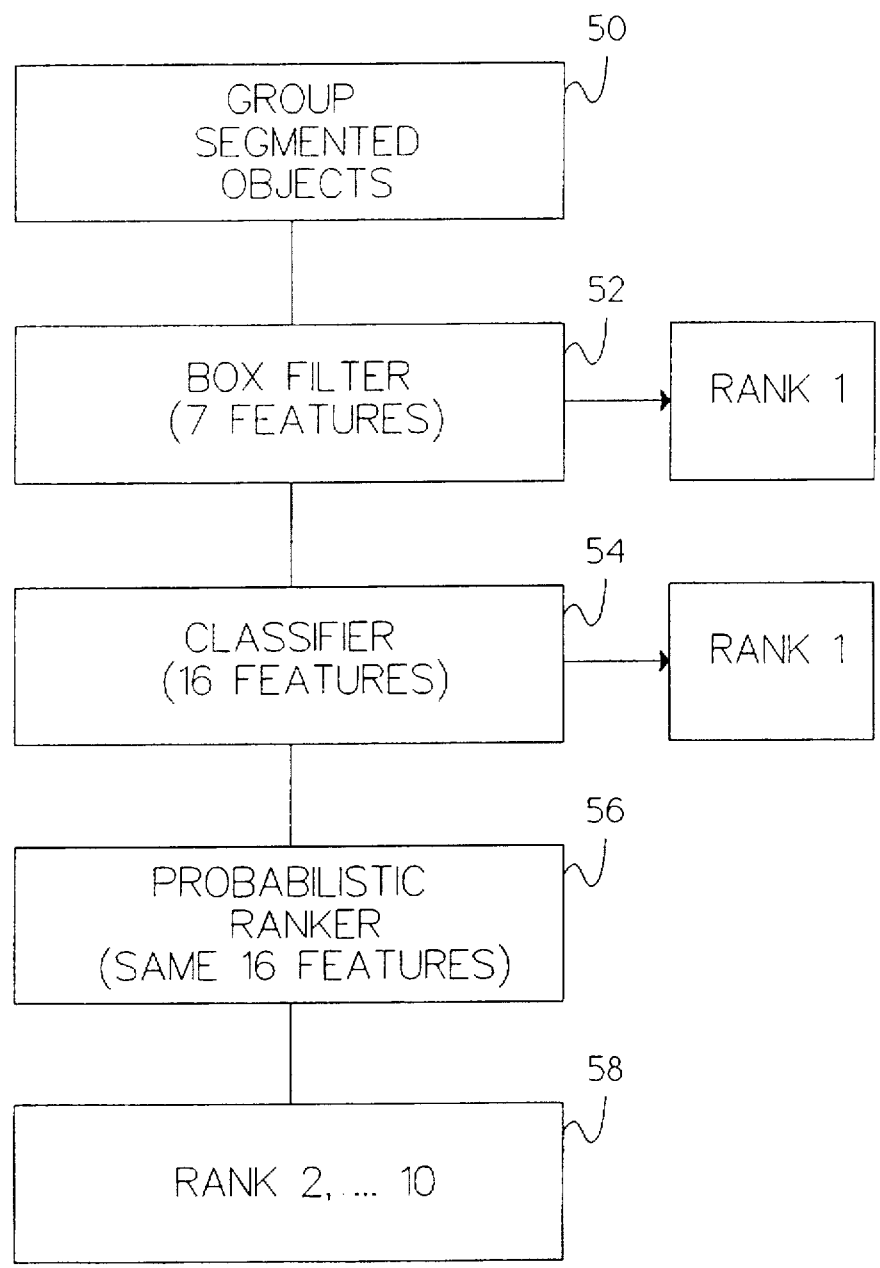
FIGS. 7A and 7B show SIL & Group Classification and Ranking Hierarchies.
Figure 7B:
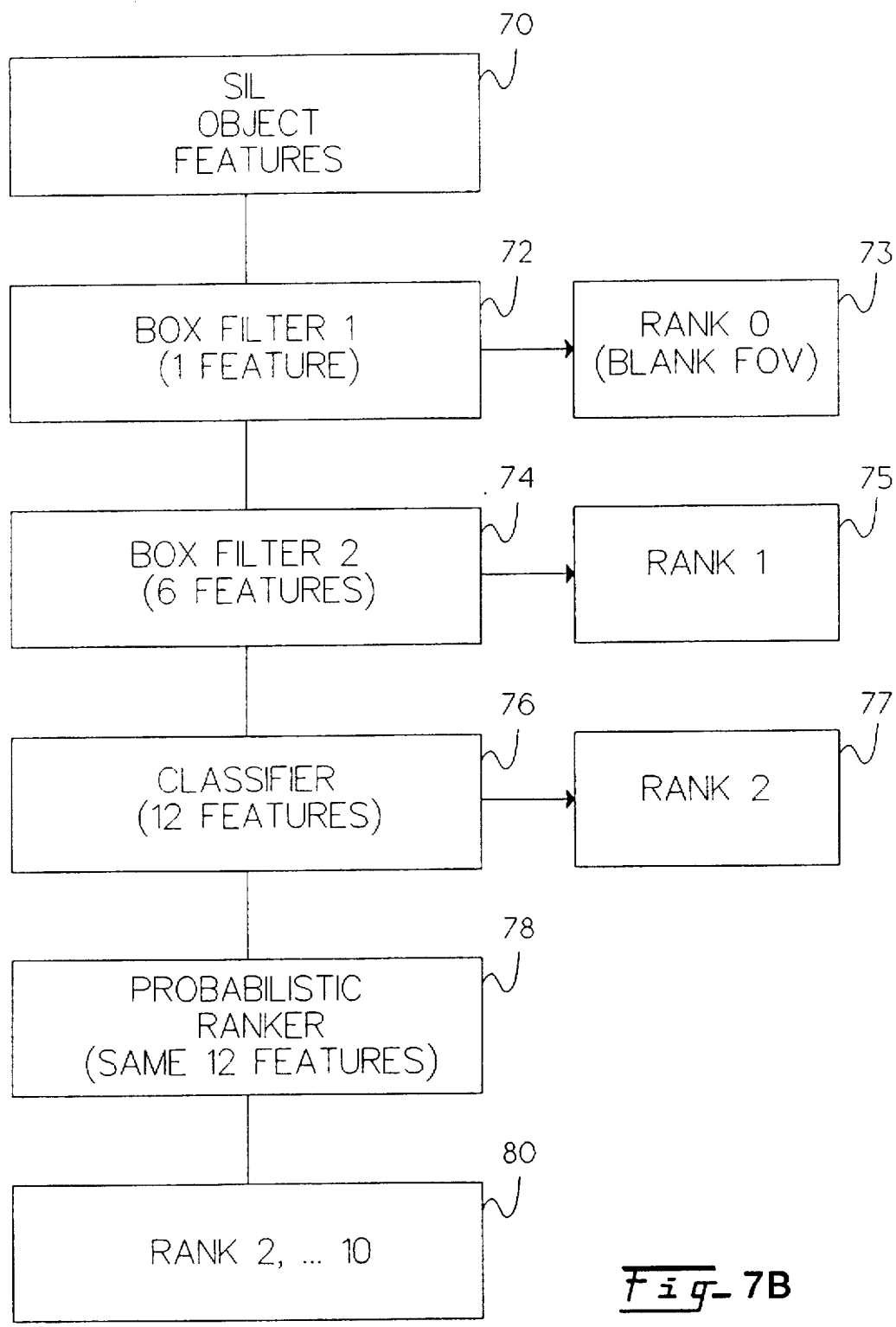

As shown in FIG. 7B, The SIL classifier and ranker consists of two box filters 72, 74, a linear Fischer decision tree classifier 76, and a probabilistic ranker 78. The filters and classifier output rank scores 73, 75 and 77. These elements and the corresponding features they use are described as follows:

Box Filter 1 The first box filter uses one feature, called no__obj, to determine the number of segmented objects in an FOV. This box filter was trained using 9,234 objects: 5,372 objects were classified as 0, meaning those FOVs had no SIL cells; 3,862 objects were classified as 1, meaning those FOVs might contain SIL cells.

Box Filter 2 The second box filter measures six features, which are used to eliminate FOVs that have little or no likelihood of containing objects of interest. These are FOVs that are blank or nearly so, or FOVs that are so highly obscured that they cannot be analyzed. The second box filter was trained using the objects that remained after the first box filter. Of these objects, 3,096 objects were classified as rank 0 and 3,809 objects classified as rank 1. The six features are: cell__std__gray, no__cell, cell__obj__ratio, sparse__object__area__ratio, cell__contrast and focus__score.

The linear Fisher decision tree 76 uses a combination of 12 features to reject less likely objects. Of the objects received from the box filters during classifier training, 932 were of class 0 and 3,681 were of class 1. The classifier passes remaining objects to the probabilistic ranker. The 12 features are:

(1) no__obj
(2) obj__mean__gray
(3) obj__mean__od
(4) obj__area__ratio
(5) cell__mean__gray
(6) cell__mean__od
(7) cell__obj__ratio
(8) sparse__obj__area__ratio
(9) obj__mean__distance1
(10) obj__mean__distance2
(11) cell__contrast
(12) focus__score The final stage of SIL classification and ranking is the probabilistic ranker 78, which assigns a rank to each object based on the likelihood estimated from the training data set. The probabilistic ranker uses the same 12 features as the classifier. Its output is a ranking score 80 between 2 and 10. This rank indicates the likelihood of an FOV containing analyzable SIL cells, with 2 being the least likely and 10 being the most likely. A binary decision tree was constructed to approximate the rank assignment based on computed probability.

Group classification and ranking is similar to the SIL counterpart. As shown in FIG. 7A, the group classifier and ranker consists of a box filter 52, a classifier 54, and a probabilistic ranker 56. These elements and the corresponding features they use are described as follows:

Box Filter—The box filter 52 uses seven features to reject segmented groups 50 that show little likelihood of being groups of endocervical cell. The box filter was trained on 10,089 objects: 7,544 objects were classified as 0 (artifacts or non-endocervical cell groups); 2,545 objects were classified as 1 (possibly endocervical cell groups). Of these objects 4,208 class 0 objects and 2,444 class 1 objects were passed to the group classifier. The seven features used by this box filter are:

(1) focus_score
(2) area
(3) dil_res_mean
(4) integrated_density_od
(5) nuclear_max
(6) nc_contrast_orig
(7) mean_orig_2

Classifier—The group classifier uses a set of 16 features.

(1) focus_score
(2) autothresh_orig2
(3) compactness
(4) cooc_homo_1_0
(5) cooc_homo_2_0
(6) cooc_inertia_1_0
(7) cooc_interia_4_0
(8) density_1_2
(9) dil_res_mean
(10) dil_res_mean2
(11) integrated_density_od
(12) mean_od
(13) nc_contrast orig
(14) percentage_run
(15) texture_correlation
(16) texture_inertia The final stage of group classification and ranking is the probabilistic ranker 56, which uses the same 16 features as the classifier. Its output 58 is a ranking score between 2 and 10, with 2 being the least likely and 10 being the most likely of containing endocervical cell group. This rank indicates the likelihood of a segmented object being an identifiable group of endocervical cells. A binary decision tree was constructed to approximate the rank assignment based on computed probability.

A group rank score is assigned to each segmented group. The final group rank assigned to each of the twenty-five 20× zones is based on the group ranks of all the groups detected within each zone area.

If a zone has no detected groups, its rank is set to 0. If there is one detected group, its rank is assigned to the zone. If there are multiple groups within one zone, the maximum rank of all the groups is the rank assigned to that zone. Groups located across multiple zones affect the ranks of those zones.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A scanning sequencer for prioritizing a plurality of scans, the scanning sequencer comprising:

(a) a camera with a first predetermined magnification and at least one second predetermined magnification, wherein the plurality of scans are taken at the second predetermined magnification, wherein the camera has an image output, wherein the second predetermined magnification is greater than the first predetermined magnification;

(b) an image processor connected to the image output, wherein the image processor first obtains an image at the first predetermined magnification wherein the image includes cells and groups of cells;

(c) a image segmenter connected to receive the image, having a segmented image output wherein the image segmenter further comprises:

(i) an image conditioner connected to the image, having a conditioned image output, (ii) a preliminary object mask detector connected to the conditioned image output having a preliminary object mask output, (iii) a large artifact detector connected to the preliminary object mask output having a large artifact output, (iv) a final object mask detector connected to the large artifact output having a final object mask output, (v) a sparse object detector connected to the final object mask output, having a sparse object output, (vi) a large object detector connected to the sparse object output having an object mask output, and (vii) a group mask segmenter connected to the final object mask output and conditioned image output having a group mask output, wherein the final object mask output, the sparse object output, the object mask output and the group mask output are provided to the image segmenter;

(d) a feature extractor connected to the segmented image output, having a feature output;

(e) an object classifier connected to the feature output having an object of interest rank output; and (f) a statistical processor for prioritizing the plurality of scans based on the image including cells and groups of cells.

2. The apparatus of claim 1 further comprising means for comparing feature measurements of the cells and groups of cells against predetermined criteria for a likelihood of existence of at least one object type of interest, wherein the means for comparing feature measurements has a sorted scan output.

3. The apparatus of claim 2 wherein the object types of interest further comprise cellular and noncellular material.

4. The apparatus of claim 1 wherein the object classifier scores images by assigning different levels of likelihood based on features measured from the image.

5. The apparatus of claim 1 wherein the feature extractor extracts features comprising measurement of size, measurement of shape, measurement of density, measurement of layout arrangement, measurement of texture, distribution of size, distribution of shape, distribution of density, distribution of layout arrangement, and distribution of texture.

6. The apparatus of claim 1 wherein the camera provides an image from a biological specimen.

7. The apparatus of claim 6 wherein the biological specimen is a specimen prepared by the papanicolaou method.

8. The apparatus of claim 6 wherein the biological specimen is a gynecological specimen.

9. The apparatus of claim 6 wherein the biological specimen is subsequently examined in accordance with the scan priority.

10. The apparatus of claim 1 wherein the image processor ignores areas that are blank or are too dense for analysis.

11. The apparatus of claim 10 further comprising means for rejecting the blank or too dense areas from further analysis.

12. The apparatus of claim 1 further comprising a ranking means for ranking each scan according to its likelihood of containing abnormal cells.

13. The apparatus of claim 12 wherein the abnormal cells comprise squamous intraepithelial lesion cells.

14. The apparatus of claim 1 further comprising a ranking means for ranking each scan according to its likelihood of containing cell groups of interest.

15. The apparatus of claim 14 wherein the cell groups of interest comprise endocervical cell groups.

16. The apparatus of claim 1 wherein the feature extractor may extract an estimated object count in a scan.

* * * * *